US005968360A

United States Patent [19]

Crowley et al.

[11] Patent Number: 5,968,360

[45] Date of Patent: Oct. 19, 1999

[54] COMPOSITION AND METHOD FOR DEGRADATION OF POLYCHLORINATED BIPHENYL COMPOUNDS

[75] Inventors: David E. Crowley; Dennis D. Focht; Eric S. Gilbert, all of Riverside, Calif.; Blanca S. Hernandez, Panama City, Panama

[73] Assignee: The Regents of the University of California, Oakland, Calif.

[21] Appl. No.: 08/863,455

[22] Filed: May 27, 1997

[51] Int. Cl.[6] ................................ C02F 3/34; B09B 3/00

[52] U.S. Cl. .......................... 210/611; 210/631; 210/909; 435/262.5; 588/207; 134/42

[58] Field of Search ......................... 588/207; 435/262.5, 435/830; 210/610, 611, 631, 909, 601; 134/42

[56] References Cited

U.S. PATENT DOCUMENTS

| | | | |
|---|---|---|---|
| 4,511,657 | 4/1985 | Colaruotolo et al. | 210/611 |
| 4,664,805 | 5/1987 | Focht | 210/611 |
| 5,376,183 | 12/1994 | Gatt et al. | 210/610 |
| 5,401,413 | 3/1995 | Gatt et al. | 210/610 |
| 5,578,474 | 11/1996 | Focht et al. | 435/830 |
| 5,618,727 | 4/1997 | Lajoie et al. | 435/262.5 |

*Primary Examiner*—Thomas G. Wyse
*Attorney, Agent, or Firm*—Brown, Martin, Haller & McClain LLP

[57] ABSTRACT

Methods and compositions are disclosed for the microbial degradation of polychlorinated biphenyl compounds (PCBs) at a concentration of 100–200 mg/kg soil in contaminated environments, using natural, non-toxic, environmentally-acceptable compounds for application to such environments, such that PCB-contaminated environments are bioremediated by inducing a metabolic pathway in PCB-degrading microbes. Inoculated or indigenous PCB-degrading microbes, such as Arthrobacter strain B1B are induced to decontaminate the PCBs. Also disclosed are a plant and chemical screening assays for identifying plants that produce metabolites which promote PCB cometabolism. Further disclosed is a method for bioremediating PCB-contaminated environments in a commercially practical manner using l-carvone, a nontoxic and inexpensive chemical component of spearmint, for the in situ cleanup of PCB-contaminated soils, to induce Arthrobacter strain B1B to cometabolize and to substantially degrade PCBs.

21 Claims, 3 Drawing Sheets

COMPOSITION AND METHOD FOR DEGRADATION OF POLYCHLORINATED BIPHENYL COMPOUNDS

BACKGROUND OF THE INVENTION

1. Field of the Invention

The invention herein relates to the removal from the environment of polychlorinated biphenyl compounds (PCBs). More particularly it relates to environmentally safe compositions and methods which degrade PCBs.

2. Description of the Prior Art

Polychlorinated biphenyls are haloaromatic compounds of exceptional chemical stability. Environmental and toxicological problems caused by the use of PCBs resulted in a restriction on their production under the Toxic Substances Control Act of 1976 and a complete ban of their manufacture by the EPA in 1979. Past negligent disposal practices have caused substantial PCB contamination of soils and surface water sediments, so that at least 15% of the PCBs manufactured in the United States now remains in the environment as highly recalcitrant contaminants. Among the acute toxicological endpoints observed following exposure to PCBs from industrial accidents are chloracne (a skin disease) and hepatotoxicity (liver damage). Of greater concern are the mutagenic and carcinogenic properties of PCBs and their suspected role in the reproductive failure of wildlife species. This role in the reproductive failure is aggravated by the lipophilic nature of PCBs and their tendency to bioaccumulate in the food chain. Other concerns with PCBs include the occurrence of impurities such as polychlorinated dibenzofurans, which are extremely toxic chemicals.

The Resource Conservation and Recovery Act of 1976 legislated a "cradle-to-grave" approach to the management of hazardous wastes, making the manufacturer and user liable for their safe disposal. The Hazardous and Solid Waste Amendment of 1984 further implemented strict regulations on the land disposal of wastes containing PCBs, dioxins, and other halogenated chemicals. Incineration is the principal PCB disposal method, but the long-range atmospheric transport of particulate-associated PCBs has resulted in the distribution of PCBs across the globe.

The current best technology for remediation of PCB-contaminated soils is excavation, followed by landfill, storage, or incineration. However, the removal of PCB-contaminated soils is a tremendous expense because of the large number of contaminated sites throughout the nation. There are also many large land areas containing low, but significant, levels of PCBs, which would be impractical to treat by conventional technology. Therefore, low cost, in situ technologies for removal of PCBs from contaminated land areas are in high demand.

Because microbiological degradation of toxic waste does not involve the use of chemical reagents which might themselves be toxic, does not produce large amounts of toxic waste, and is comparatively low cost, microbiological degradation is a better method of disposing of toxic waste than incineration or removal. Specifically, bioremediation of soils by PCB-degrader microbes is a promising, low cost technology for in situ treatment of PCB-contaminated soils. However, there are many problems unique to PCB degradation that have slowed the development of an effective approach for degradation of these compounds.

Natural environments contain indigenous microbes having differing capabilities for metabolizing PCB contaminants. Some microbes can only metabolize PCBs at a slow rate, such that there is only a minimal decrease in the concentration of PCBs persisting in the soil over time. Still other indigenous microbes are not well enough understood to be used in any commercially practical manner.

The initial step in the metabolism of PCBs to innocuous metabolic products is cometabolic, meaning that the organism responsible for the PCB degradation gains no energy from the process. See, R. S. Horvath, *Bacteriological Reviews,* 36:146 (1972). Therefore, the PCB degradation must be sustained by an alternative compound which serves as the growth substrate. Cometabolism is understood by those skilled in the art as presenting a barrier to the effective remediation of PCB-contaminated environments. PCB degradation occurs only if the requisite enzymes have been induced by growth on a suitable substrate. It is understood by those skilled in the art that those microbes that are capable of degrading PCBs will not do so unless and until their bph genes are induced to produce the enzymes required for PCB biodegradation. It is also understood by those skilled in the art that an inducer of bph genes has some aspect of its chemical structure that is analogous to PCBs.

Most current methods for microbial degradation of toxic materials require the discovery of a particular microbe that will metabolize the toxic material, converting it to innocuous metabolic products. Finding microbes which can efficiently and safely metabolize toxic wastes is a complex procedure involving many arduous steps and requiring a significant expenditure of time. One such method is taught in U.S. Pat. No. 4,493,895 (1985) to Colaruotolo et al., wherein is described a method for the microbial degradation of organic wastes into innocuous materials. This process involves (1) collecting a sample of material from the site contaminated with toxic wastes; (2) enriching the microbes found living in the sample; (3) separating the strains of microbes from each other; (4) purifying the strains that can degrade the toxic substance; (5) applying the strain to the contaminated area; and (6) monitoring of degradation of the toxic substance at the contaminated area. Another method taught in U.S. Pat. No. 4,511,657 (1985) to Colaruotolo et al. involves a process of treating chemical waste landfill leachates with activated sludge containing bacteria capable of metabolizing toxic substances present in the leachates. Both of these methods require large amounts of time and effort. It would be desirable if, rather than isolating and characterizing a particular microbe that can degrade PCBs and adding it to the PCB-contaminated environment, indigenous microbes could be induced to accomplish the degradation of PCBs.

Some bacteria have recently been shown to be capable of degrading PCBs in the laboratory. In *Microbial Degradation of Organic Compounds*, David T. Gibson, Ed., p. 362, Marcel Dekker, Inc., New York (1984), the metabolism of commercial PCB mixtures and biphenyl is discussed, but no commercially practical process for degrading PCBs in a natural environment is described. K. Furukawa et al, *Applied And Environmental Microbiology,* 46:140 (1983) describe the use of Acinetobacter strains to metabolize commercial mixtures of PCBs and deduce a pathway for PCB metabolism. These references do not disclose a commercially practical process for the decontamination of PCB-contaminated environments. None of the references teaches how non-indigenous microbes specifically adapted for the metabolism of the contaminant can be utilized with microbes indigenous to the environment to accomplish decontamination at a practical rate.

U.S. Pat. No. 4,664,805 (1987) to Focht describes how environments contaminated with toxic halogenated organic compounds can be decontaminated at an accelerated rate by the addition to the contaminated environment of non-indigenous microbes along with analogs of the halogenated contaminant. Among the microbes that can be added to the contaminated soil are Acinetobacter sp. (Furukawa), Strain P6, *Pseudomonas putida*, Strain UC-R5, and *Pseudomonas putida*, Strain UC-P2. The specific PCB analogs added to the PCB-contaminated soil is biphenyl (the non-chlorinated analog of PCBs). Biphenyl has the following chemical structure:

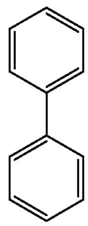

In the laboratory, biphenyl can be used successfully as an inducer and growth substrate for PCB degradation. However, biphenyl is subject to environmental regulation as a designated pollutant and cannot be introduced into soils. Consequently, there is a continuing need to identify other compounds that promote PCB bioremediation yet are safe to introduce into the environment.

SUMMARY OF THE INVENTION

The invention described herein provides a method for the microbial degradation of polychlorinated biphenyl compounds (PCBs) in contaminated environments. The invention is a method for discovering naturally-occurring, non-toxic, environmentally-acceptable compounds for inducing PCB degradation. The invention is also a method for bioremediation of PCB-contaminated environments.

Further, the invention herein is a composition useful for the degradation of PCBs, comprising a nonhalogenated compound that induces the microbial cometabolism of polychlorinated biphenyl compounds. It includes in further embodiments a microbe which cometabolizes polychlorinated biphenyl compounds, the microbe being induced to cometabolize polychlorinated biphenyl compounds by the nonhalogenated compound. The nonhalogenated compound is preferably a terpenoid compound, and more preferably a terpene, especially a carvone or limonene.

In one embodiment, the invention is a method for identifying materials which promote PCB cometabolism. In a specific embodiment, the invention is a method for identifying plants that produce metabolites which promote PCB cometabolism. In another specific embodiment, the invention is a method for identifying chemicals which promote PCB cometabolism. In another specific embodiment, the invention is a method for decontaminating PCB environments that tests metabolites for their ability to promote PCB cometabolism. In still another specific embodiment, the invention is a method for decontaminating PCB environments in a commercially practical manner.

In one embodiment, an inoculum of PCB-degrading microbes is added to the contaminated environment. These microbes can degrade PCBs at a rate greater than that which indigenous microbes can metabolize the contaminant. In a more specific embodiment, the microbe added to the contaminated environment is Arthrobacter strain B1B .

In a different embodiment, no microbes are added; rather, microbes indigenous to the contaminated environment are induced to degrade the PCBs. The advantage is that the microbes are already adapted to the site and there are no problems associated with the delivery of a microorganism to the site. This invention is therefore superior to the prior art because there is no need for the addition of microbes which are not indigenous to the contaminated environment.

In another specific embodiment, the non-toxic PCB analog is a nonhalogenated, structurally related organic compound. In another specific embodiment, the analog does not support growth of the microbes that degrade the contaminant present in the environment. This invention is superior to the prior art because, while there is also added to the environment a non-toxic analog of the contaminant, the non-toxic analog of the contaminant need not be a growth substrate fore the inoculant microbe nor for the indigenous microbes.

In a specific embodiment, the invention is a method based on the use of l-carvone, a chemical component of spearmint which is nontoxic and inexpensive for use in the in situ cleanup of PCB-contaminated soils, to induce Arthrobacter strain B1B to substantially degrade PCBs.

Unless defined otherwise, all technical and scientific terms used herein have the same meaning as is commonly understood by one of skill in the art to which the subject matter herein belongs.

As used herein, the "rhizosphere" refers to the soil region subject to the influence of plant roots and characterized by a zone of increased microbial activity.

As used herein, "degradation" of PCBs refers to the degradation of PCB molecules. PCBs may be degraded to other PCB compounds. As used herein, "degradation" does not refer to the complete elimination of PCBs from the soil. "Degradation" is not a quantitative term.

As used herein, "bph" is a set of co-regulated microbial genes encoding microbial proteins that are used by microbes for the metabolism of PCBs and other biphenyl compounds. Typically, but not necessarily, there are four bph genes that code for a dioxygenase, a dehydrogenase, a dioxygenase, and a hydrolase to convert biphenyl to benzoate and a five-carbon aliphatic acid.

As used herein, "culture" means a propagation of cells in a medium conducive to their growth, and all subcultures thereof.

As used herein, "microbes" includes bacteria, archaebacteria, fungi, algae, protozoa, slime molds, and other microorganisms, whether unicellular or multicellular.

DETAILED DESCRIPTION AND PREFERRED EMBODIMENTS

Figure 1A:
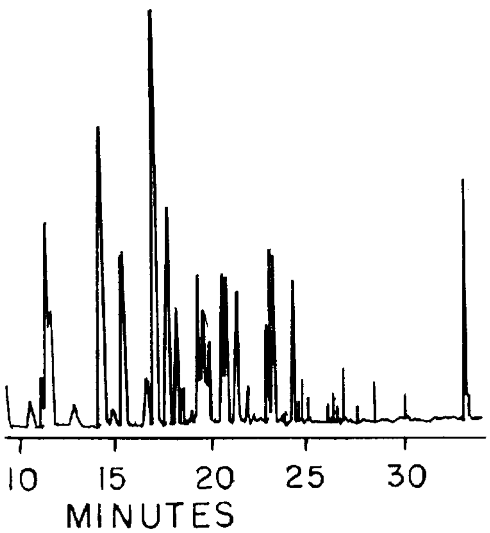
FIG. 1 shows six graphs (labeled A–F) of gas chromatographic analyses of test samples illustrating typical effects of the process and compositions of this invention.
Figure 1B:
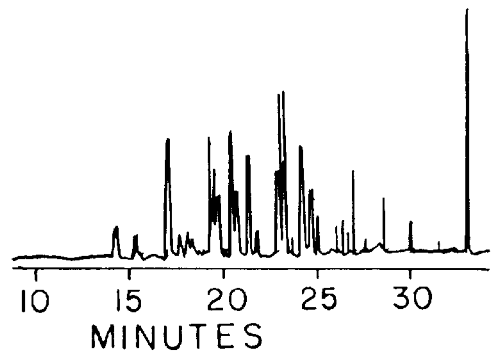
Figure 1C:
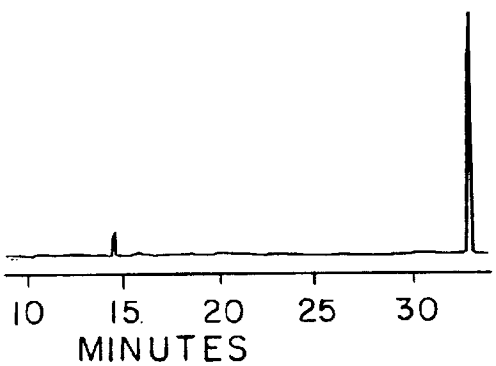
Figure 1D:
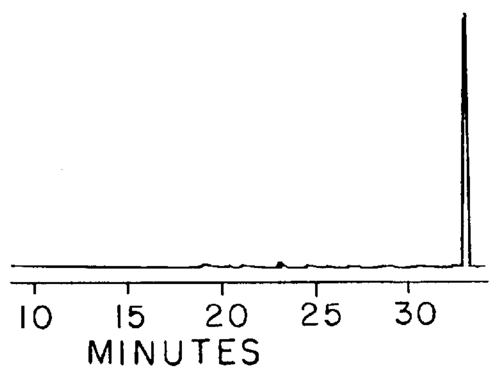
Figure 1E:
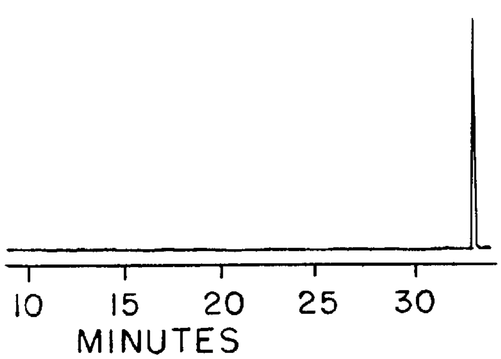
Figure 1F:
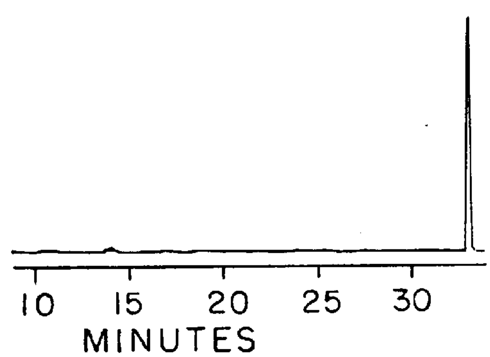

There are three interrelated components to the invention described herein: (1) a screening assay to identify plants which contain compounds that induce PCB cometabolism; (2) a chemical assay to test individual plant 22 derived chemicals for their ability to induce PCB cometabolism, and (3) a method to biodegrade PCBs in a commercially practical manner.

Plant Screening Assay

The plant screening assay provides a rapid, inexpensive, and convenient method to identify plants which produce naturally-occurring, non-toxic, environmentally-acceptable PCB analogs. The PCB analogs identified are useful for inducing microbial metabolism of PCBs in contaminated environments. This plant screening assay is simple and readily adaptable to a wide variety of known plants and vegetative materials (i.e., individual parts of plants).

Specific plants or vegetative materials which have been examined include eucalyptus leaves, orange leaves, ivy leaves and pine needles. All of these showed enhanced ability to form biphenyl degrading colonies in the presence of a commercial PCB mixture available under the trade designation Aroclor® 1242. The respective degree of formation of colony forming units (CFU) per gram of soil in the presence of Aroclor 1242 are shown below in Table 1:

TABLE 1

| Material | log CFU/g |
|---|---|
| Aroclor 1242 alone (control) | 3.3 |
| Eucalyptus leaves | 7.9 |
| Orange leaves | 8.1 |
| Ivy leaves | 8.1 |
| Pine needles | 7.8 |

In each case the test system consisted of 100 g of a California soil having a pH of 6.8 and 10 mg of Aroclor 1242. The vegetable materials were present as 5 g (dry mass). Each system (including the control) was incubated for six months at ambient temperature and 50% soil saturation, at the end of which 1 g of the test soil sample was re moved for microbial enumeration and the remainder extracted with a 1:1 volumetric mixture of hexane:acetone for gas chromatographic analysis. It will be evident from Table 1 that the materials tested show enhancement of several orders of magnitude over the control (average of $10^8$ cells/g of soil for the material systems compared to $10^3$ cells/g for the control samples), indicating the effectiveness of these types of plants to promote substantial degradation of PCBs. In this particular series of tests there was no attempt to isolate particular molecular components of the plants.

The results of tests on samples of these materials are shown in FIG. 1. Each of the six graphs shows the result of a gas chromatographic analysis of a specific sample. Graph A is a sample of Aroclor 1242 at 100 ng. Graphs B–F are soil samples contaminated with Aroclor 1242. Graph B shows a test with a sample of non-amended soil, while Graphs C–F show respectively samples of soil amended with eucalyptus leaves, orange peels, pine needles and ivy leaves. (The peak at 34 min. is the internal standard of 2, 3, 4, 2',3',4'-hexachlorobiphenyl.) It will be evident that in the case of each of the amended soils, transformation of the Aroclor 1242 contaminant was substantially complete.

Figure 2:
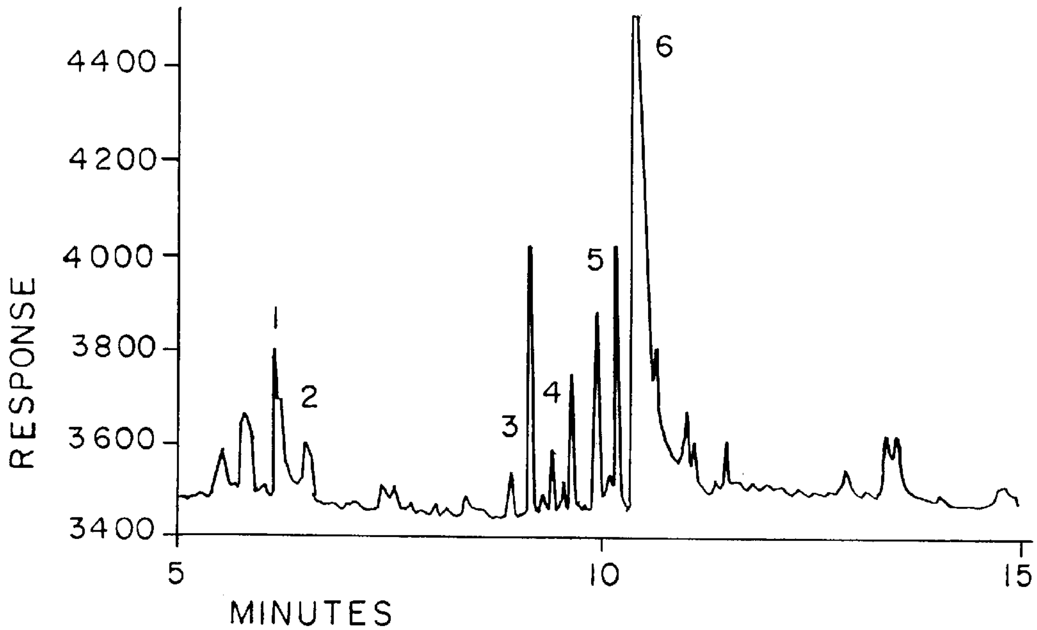
FIG. 2 is a graph of gas chromatographic analysis of spearmint extract, showing one component having a predominant presence.
Figure 3A:
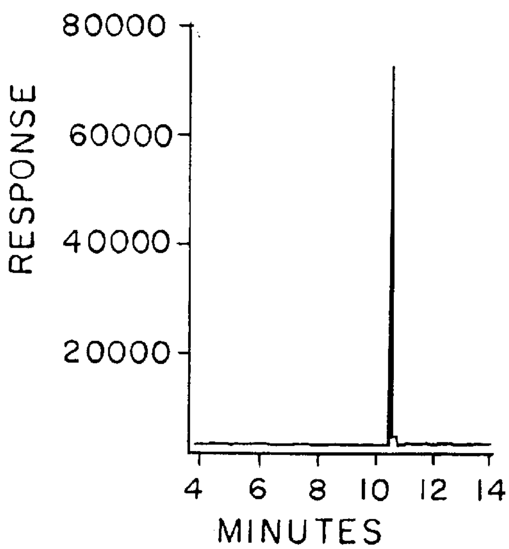
FIG. 3 shows the change in concentration (comparing graph A with Graph B) in spearmint-minimal salts medium of the predominant component of FIG. 2 after cell growth.
Figure 3B:
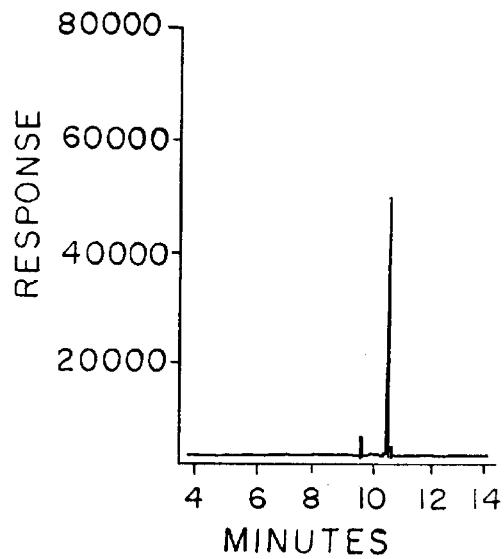
Figure 4A:
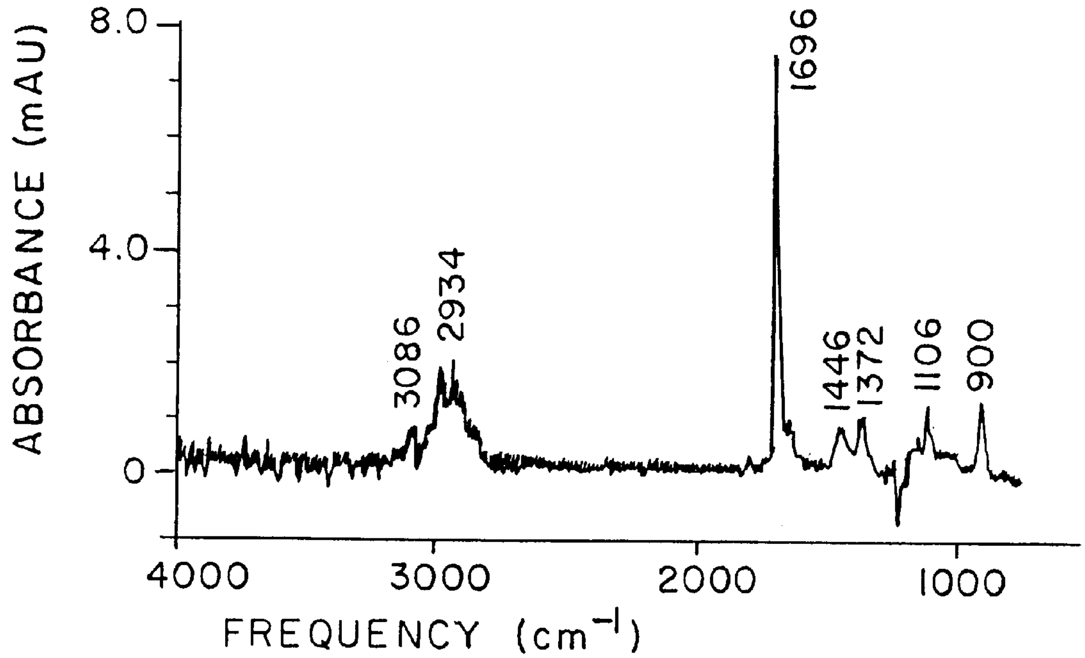
FIG. 4 illustrates the identification of the predominant component of FIG. 2 as l-carvone (Graph B) by comparison with a gas chromatographic spectral library reference (Graph A).
Figure 4B:
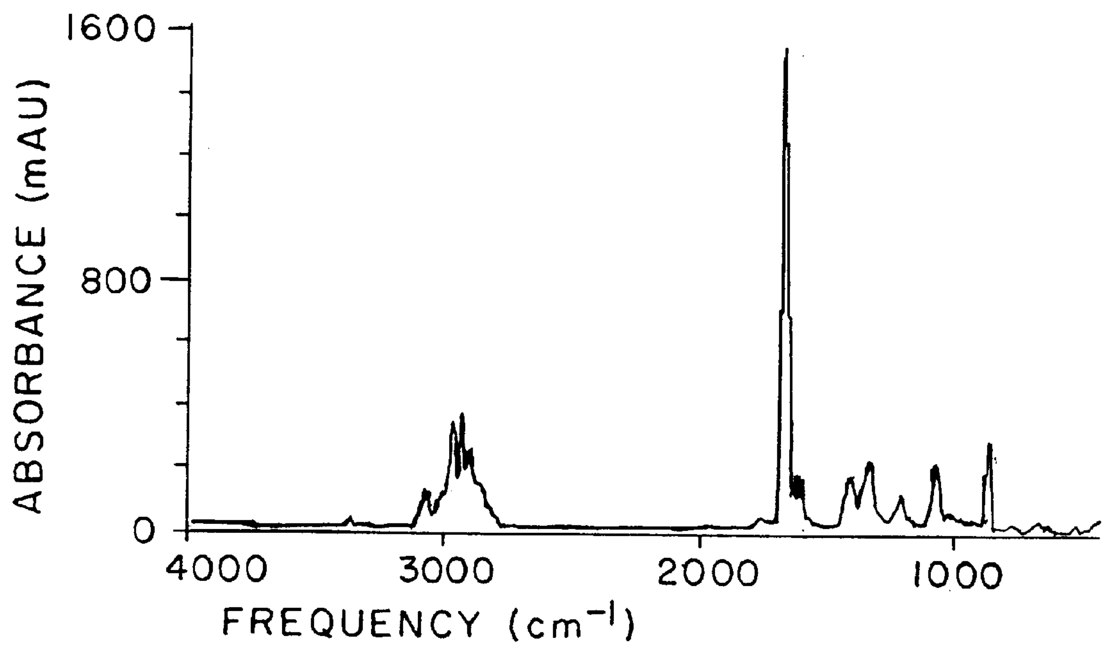

Similar data are shown in FIGS. 2–4. FIG. 2 illustrates gas chromatographic analysis of spearmint extract from a spearmint-minimal salts medium identifying a number of distinct nonpolar components (the principal ones are limonene [1], 3-carene [2], p-menthan-1-ol [3], dihydrocarvone [4], carvenol [5] and carvone [6]). Of these, however, carvone [6] clearly predominates, being over 90% of the total mixture as determined by peak areas. FIG. 2 shows a separate test of carvone (the peak at 10.5 minutes) in a spearmint-minimal salts medium before inoculation with Arthrobacter sp. strain B1B (Graph A) and after 26 hours of cell growth (Graph B), showing a decrease from 5 to 3 mg/L, indicating that carvone was responsible for induction of PCB cometabolism. Finally, FIG. 4 illustrates the identification of component 6 as l-carvone (Graph B) by comparison with a standard reference library spectrum known to be l-carvone (Graph A).

Focus on specific chemicals present in plants was considered in a series of experiments in which the 1 g soil samples mentioned above were divided into smaller sample quantities and tested for their ability to use the terpene chemicals listed in Table 2 (next page) as an inducer for the degradation of biphenyl with which the soil was inoculated. ("n/d" indicates that the specific chemical was not tested with the indicated sample. "+" indicates a positive response, while "–" indicates a negative response.)

TABLE 2

| Sample No. | Cymene | Pinene | Abietic Acid | Limonene |
|---|---|---|---|---|
| 1 | n/d | + | + | + |
| 2 | + | + | + | + |
| 3 | n/d | n/d | + | + |
| 4 | n/d | + | + | + |
| 5 | + | + | + | + |
| 6 | n/d | + | + | + |
| 7 | — | n/d | + | + |
| 8 | — | + | + | + |
| 9 | + | n/d | + | + |
| 10 | + | n/d | + | — |

Further plant screening assaying was done in the following manner: Plant extracts are prepared from plant roots and shoots, and normalized to 500 ppm soluble carbon. Arthrobacter strain B1B , a Gram-positive soil isolate that is a well-characterized PCB-degrader, was inoculated and grown on selected plant extracts for 24–36 hours. The cells were subsequently washed and resting cell suspensions were prepared. 4,4'-dichlorobiphenyl was added to a concentration of 15 ppm. The resultant ring fission product was analyzed spectrophotometrically at its characteristic wavelength of 434 nm. The plant assay takes advantage of a colorimetric change which results from the formation of ring fission product during microbial oxidation of PCBs.

The formation of a yellow color indicates that the plant contains a chemical component which induces PCB cometabolism. Rates of ring fission product formation after growth on plant substrates are compared to rates of formation after growth on biphenyl, the non-chlorinated PCB analog and also non-selective substrates.

Chemical Screening Assay

The chemical screening assay provides a rapid, inexpensive, and convenient method to test individual plant-derived chemicals for their ability to induce PCB cometabolism. This chemical screening assay is simple and readily adaptable to a wide variety of known chemicals. When done in conjunction with the previously described plant screening assay, the chemical screening assay provides further confidence that the plant-derived chemicals will be effective for inducing PCB-degradation.

The chemical screening assay is done in the following manner: a fructose-minimal salts medium is prepared and a small amount of test chemical is added. Washed cell suspensions of Arthrobacter strain B1B are prepared; 4,4'-dichlorobiphenyl subsequently is added and the rate of formation of the phenylhexadienoate ring fission product is monitored spectrophotometrically. If a yellow color forms during the individual chemical assay, it demonstrates that the test chemical induces PCB cometabolism.

Application of Naturally-occurring, Non-toxic, Environmentally-acceptable PCB Analog to PCB-Contaminated Environment The application of a naturally-occurring, non-toxic, environmentally-acceptable PCB analog, identified by the previously described plant screening assay and the previously described chemical screening assay to a PCB-contaminated environment is a commercially practical method of PCB-degradation.

The method of PCB-degradation is done in the following manner: The naturally-occurring, non-toxic, environmentally-acceptable PCB analog identified by the plant screening assay and the chemical screening assay is contacted with the PCB-contaminated environment by one of several methods known to those skilled in the art. Generally, the means chosen to contact the naturally-occurring, non-toxic, environmentally-acceptable PCB analog or the analog plus an PCB-degrading microbe with the soil will depend upon a number of factors including, but not limited to, the degree and duration of contamination of the soil, location and distribution of contamination and the composition and condition of the soil. Where contamination is high but has not been present for an extended period of time, the PCB contamination will be primarily localized to the top 6" to 10" (15–25 cm) of the soil. In such a situation, topical application of the analog, for example, by spraying the ground surface with a solution containing the naturally-occurring, non-toxic, environmentally-acceptable PCB analog or the analog plus the added PCB-degrading microbe, may be used.

There are several ways that the application of a naturally-occurring, non-toxic, environmentally-acceptable PCB analog is superior to the prior art. Because this invention does not require the transportation of PCB-contaminated soil for disposal or incineration, the desired decontamination is accomplished at a reduced cost. Similarly, because the naturally-occurring, non-toxic, environmentally-acceptable PCB analog is not needed as a microbial substrate but only as a microbial inducer (i.e., the PCB analog induces PCB-degradation without itself serving as a growth substrate for the microbes), the PCB analog can be used in very low concentrations. Further, we anticipate that because this invention does not require the addition of non-indigenous microbes, the desired decontamination may under some conditions be accomplished without the time and cost of obtaining or identifying a PCB-degrading microbe appropriate to the particular environment. All of these further reduce the cost of bioremediation compared to the methods used in the prior art.

EXAMPLE I

The purpose of this Example was to show that the plant screening assay and the chemical screening assay could effectively identify naturally-occurring, non-toxic, environmentally-acceptable compounds for inducing PCB-degradation. The assays identified components contained in extracts from spearmint (Mentha spicata) or spearmint oil that strongly induced Arthrobacter strain B1B, a microbe indigenous to soil found near Applicants'laboratory at the Riverside, California, campus of assignee University of California, to metabolize a commercial PCB-mixture. As is apparent from Table 1, growth of the Arthrobacter strain B1B in either biphenyl medium or spearmint extract resulted in PCB cometabolism promotion, while growth in tryptic soy broth (a rich, non-selective medium) did not result in significant PCB cometabolism. This indicated that some component of the spearmint extract, which we determined to be carvone, was responsible for promotion of the PCB cometabolism with a result analogous to the promotion effected by growth in biphenyl medium. We also determined that carvone is effective as an active inducer of PCB cometabolism at less than 50 ppm, a very low concentration. While we did not determine the exact genes which were induced by growth in spearmint extract, we believe that they were the bph genes, based on observed formation of the characteristic ring fission product.

Plant Screening Assay

The results from the plant screening assay showed that spearmint contains a chemical component which induces PCB cometabolism. Root extracts from non-aromatic plants, such as rye grass (*Lolium perenne*) and green bean (*Phaseolus vulgaris*), did not stimulate biphenyl ring fission by Arthrobacter strain B1B, as measured by the degradation of 4,4'-dichlorobiphenyl. Neither did selected composted materials. However, *Mentha spicata* was an effective inducer of phenyl ring fission by Arthrobacter strain B1B. These results are illustrated in Table 3.

TABLE 3

| Compound | Common Name | Product Formation Rate (ng product/ mg protein/hr) |
|---|---|---|
| Biphenyl | — | 1634 ± 403 |
| Tryptic Soy Broth | — | 80 ± 4 |
| *Mentha spicata* | spearmint | 509 ± 59 |
| *Alentha pulegium* | pennyroyal | 0 |
| *Ocimum basilicum* | basil | 16 ± 1 |
| *Hordeum vulgare* | barley | 30 ± 1 |
| *Phaseolus vulgaris* | green bean | 0 |
| *Anethum sp.* | dill | 0 |
| avocado litter | — | 0 |
| yard compost | — | 0 |

Note: The plant screening assay was used to identify plants which promote the PCB-degradation activity of Arthrobacter strain B1B, a naturally-occurring soil bacterium known to cometabolize PCBs when grown on biphenyl. Spearmint was identified as a PCB-degradation promoting plant.

Further analysis by gas chromatography-Fourier Transform infrared spectroscopy (GC-FTIR) determined that the compound was l-carvone.

The results illustrated in Table 1 show that the plant screening assay can rapidly identify naturally-occurring, non-toxic, environmentally-acceptable compounds from common plants. The plant screening assay is therefore simpler and more rapid than the screening assays to identify PCB-degrading microbes found in the prior art. These results also show that the plant screening assay is simple and readily adaptable to a wide variety of plants.

Chemical Screening Assay

The results from the chemical screening assay confirmed that spearmint contains a chemical component which induces PCB cometabolism and that the compound was l-carvone.

When Arthrobacter strain B1B was grown in a fructose-carvone medium and subsequently used in resting cells suspensions, the microbe substantially degraded a commercial PCB mixture available under the trade designation Aroclor® 1242. Four stereochemical isomers of l-carvone [(R)-(−)-carvone (d-carvone), (S)-(+)-carvone (l-carvone), (S)-(−)-limonene (l-limonene), and (R)-(+)-limonene (d-limonene)] were used to induce degradation the PCB mixture. These results are illustrated in Table 4.

TABLE 4

| Compound | Product Formation Rate (ng product/ mg protein/hr) |
|---|---|
| (R)-(−)-carvone | 845 ± 187 |
| (S)-(+)-carvone | 860 ± 117 |
| (S)-(−)-limonene | 821 ± 163 |
| (R)-(+)-limonene | 807 ± 103 |

The results illustrated in Table 2 show that the stereochemistry of the l-carvone isomer did not affect the PCB cometabolism rate. The chemical structure of carvone is:

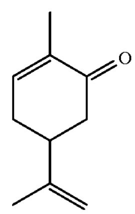

The chemical structure of limonene is:

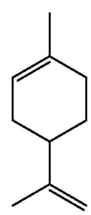

The results from the chemical screening assay further showed that other compounds structurally related to PCBs induces the cometabolism PCB compounds. The common structural motif among the most effective compounds was an unsaturated para-menthane moiety. Only those compounds which had activities equal to or greater than the activity of cumene were found to be significantly different in effect than the control. These results are illustrated in Table 5 on the following page.

TABLE 5

| Compound | Product Formation Rate (ng product/ mg protein/hr) |
|---|---|
| para-cymene | 1471 ± 343 |
| isoprene | 928 ± 52 |
| (S)-(+)-carvone | 860 ± 117 |
| (R)-(+)-carvone | 845 ± 187 |
| (S)-(−)-limonene | 821 ± 168 |
| (R)-(+)-limonene | 807 ± 103 |
| biphenyl | 706 ± 72 |
| carvacrol | 509 ± 19 |
| cumene | 280 ± 110 |
| para-xylene | 188 ± 80 |
| toluene | 138 ± 23 |
| trans-cinnamic acid | 87 ± 3 |
| thymol | 70 ± 10 |
| benzene | 61 ± 13 |
| fructose only (control) | 73 ± 48 |

Note: The presence of a para- position isopropyl group on the inducing chemical greatly increased the rate of PCB cometabolism. Saturation of the isopropyl moiety did not affect the rate PCB cometabolism.

The results illustrated in Table 5 show that there is a variety of chemicals, other than l-carvone, that can induce the bph genes in Arthrobacter strain B1B. The results indicate the possibility that other naturally-occurring, non-toxic, environmentally-acceptable chemicals can be found in common plants or from previously identified chemicals. The chemical screening assay is therefore simpler and more rapid than a screening assay to identify PCB-degrading microbes, as are found in the prior art. These results also show that the chemical screening assay is simple and readily adaptable to a wide variety of chemicals.

EXAMPLE II

The purpose of this Example was to show that a variety of PCB compounds could be degraded by microbes that had been induced by a naturally-occurring, non-toxic, environmentally-acceptable PCB analog that had been identified by the plant screening assay and the chemical screening assay. In this Example, l-carvone induced the cometabolism of several PCBs by Arthrobacter strain B1B.

When Arthrobacter strain B1B was grown in a fructose-carvone medium and was subsequently used in resting cells suspensions, the microbes substantially degraded Aroclor® 1242. The results were assayed by flame ionization detection gas chromatography (GC-FID). 26 of 32 chromatographic peaks, corresponding to PCB congeners in the mixture, were cometabolized. Several chlorobenzoates (intermediates of microbial metabolism of PCBs) were also identified by HPLC, showing that the PCB degradation was microbially-mediated, showing that hydrolysis of the phenylhexadienoate ring fission product also occurred. 4-chlorobenzoate was identified as a metabolite, showing that hydrolysis of the phenyl ring fission product also occurred.

Cometabolism assays were conducted for periods of eight hours, as illustrated in Table 6, and fifteen hours, as illustrated in Table 7. In both cometabolism assays, l-carvone induced the cometabolism of PCBs by Arthrobacter strain B1B.

Subsequent studies compared carvone-induced cells with cells grown in fructose-MS medium. In samples taken at 8 hours after addition of PCBs, 59±2% of the total Aroclor 1242 was degraded by the carvone-induced cells, whereas only 7±6% of the total Aroclor was degraded by the fructose-grown cells (Table 6). Further incubation resulted in only a slight increase in the total Aroclor degradation by carvone-induced cells, which reflected slower degradation of the less abundant, more highly chlorinated congeners. After 15 hours, 26 of 32 peaks showed a 15% or greater peak area reduction with carvone-induced cells, as compared to 11 peaks after incubation with fructose-grown cells (Table 7).

The tetra- and pentachlorobiphenyls were transformed at a slower rate than the di- and trichlorobiphenyls. After 8 hours of incubation with carvone-induced cells, total peak areas for the tetra- and pentachlorobiphenyls showed 33±6% and 9±3% reductions, respectively (Table 6). After 15 hours, there was a further decrease in peak areas, such that 46±3% of the tetrachlorobiphenyls and 14±6% of the pentachlorobiphenyl congeners were degraded (Table 7).

TABLE 6

| | 8-Hour Study | |
|---|---|---|
| Congener | Fructose + Carvone; Avg. % Degradation | Fructose Only; Avg. % Degaradation |
| 2, | internal std. | internal std. |
| 2,2'; 2,.6 | 100 ± 0 | 18 ± 4 |
| 2,3' | 58 ± 15 | 10 ± 7 |
| 2,3; 2,4' | 100 ± 0 | 34 ± 6 |
| 2,2',6 | 6 ± 9 | 8 ± 7 |
| 2,2',5 | 78 ± 2 | 4 ± 7 |
| 4,4'; 2,2',4 | 36 ± 3 | 6 ± 7 |
| 2,2',3;2,4',6 | 67 ± 4 | 7 ± 3 |
| 2,3',5 | 77 ± 1 | 6 ± 5 |
| 2,3',4 | 66 ± 9 | 7 ± 11 |
| 2,4',5 | 80 ± 2 | 4 ± 6 |
| 2',3,4;2,2',5,6' | 85 ± 2 | 5 ± 8 |
| 2,3,4' | 25 ± 8 | 2 ± 5 |
| 2,2',3,6 | 1 ± 7 | 0 ± 4 |
| 2,2',3,6' | 7 ± 12 | 0 ± 14 |
| 2,2',5,5' | 6 ± 8 | 2 ± 5 |
| 2,2',4,5' | 1 ± 8 | 3 ± 7 |
| 2,2',4,4' | 14 ± 6 | 3 ± 6 |
| 2,2',3,5' | 60 ± 6 | 3 ± 4 |
| 2,2',3,4' | 25 ± 6 | 2 ± 8 |
| 2,2',3,4; 2,3,4',6; 2,3',4',6 | 1 ± 7 | 3 ± 4 |
| 2,2',3,3' | 18 ± 10 | −1 ± 4 |
| 2,4,4',5 | 40 ± 7 | 1 ± 10 |
| 2,3',4',5 | 52 ± 5 | 2 ± 7 |
| 2,3',4,4'; 2,2',3,5',6 | 30 ± 6 | 2 ± 6 |
| 2,3,3',4; 2,3,4,4'; 2,2',3,3',6; 2,2',3,5,5' | 12 ± 5 | 1 ± 6 |
| 2,2',3,4',6 | 13 ± 5 | 1 ± 6 |
| 2,2',3,4',5; 2,2',4,5,5' | internal std. | internal std. |
| 2,2';4,4',5 | 7 ± 4 | 9 ± 8 |
| 2,2',3',4,5; 2,2',3,5,6,6' | −1 ± 7 | 10 ± 13 |
| 2,2',3,4,5' | 4 ± 2 | −2 ± 6 |
| 2,3,3',4',6; 3,3',4,4' | 10 ± 10 | 2 ± 6 |
| 2,2',3,4',5',6; 2,3,4,4',5 | 9 ± 0 | −21 ± 24 |

Note: Cometabolism of PCB mixture, 8-hour study. Arthrobacter strain B1B was grown in a fructose-carvone medium and was subsequently used in resting cells suspensions to metabolize Aroclor ® 1242 for eight hours. Results were assayed by GC-FID.

TABLE 7

| | 15 Hour Study | |
|---|---|---|
| Congener | Fructose + Carvone; Avg. % Degradation | Fructose Only; Avg. % Degradation |
| 2, | internal std. | internal std. |
| 2;2'; 2,6 | 100 ± 0 | 56 ± 47 |
| 2,3' | 100 ± 0 | 66 ± 30 |
| 2,3; 2,4' | 100 ± 0 | 100 ± 0 |
| 2,2',6 | 19 ± 3 | −6 ± 41 |
| 2,2',5 | 78 ± 4 | 40 ± 18 |
| 4,4'; 2,2',4 | 61 ± 15 | 29 ± 20 |
| 2,2',3; 2,4',6 | 71 ± 3 | 19 ± 4 |
| 2,3',5 | 67 ± 16 | 77 ± 20 |
| 2,3',4 | 92 ± 13 | 77 ± 20 |
| 2,4',5 | 97 ± 1 | 25 ± 3 |
| 2',3,4; 2,2',5,6' | 89 ± 2 | 38 ± 6 |
| 2,3,4' | 47 ± 5 | 4 ± 6 |
| 2,2',3,6 | 18 ± 1 | −2 ± 9 |
| 2,2';3,6' | 18 ± 9 | −6 ± 10 |
| 2,2',5,5' | 17 ± 6 | 5 ± 4 |
| 2,2',4,5' | 15 ± 9 | 3 ± 5 |
| 2,2',4,4' | −8 ± 28 | 4 ± 5 |
| 2,2',3,5' | 77 ± 3 | 5 ± 8 |
| 2,2',3,4' | 44 ± 5 | 9 ± 3 |
| 2,2',3,4; 2,3,4',6; 2,3',4',6 | 12 ± 8 | 1 ± 7 |
| 2,2',3,3' | 42 ± 5 | −3 ± 12 |
| 2,4,4',5 | 67 ± 5 | 2 ± 6 |

TABLE 7-continued

| | 15 Hour Study | |
|---|---|---|
| Congener | Fructose + Carvone; Avg. % Degradation | Fructose Only; Avg. % Degradation |
| 2,3',4',5 | 81 ± 5 | 4 ± 6 |
| 2,3',4,4'; 2,2',3,5',6 | 54 ± 7 | 3 ± 5 |
| 2,3,3',4;2,3,4,4'; 2,2',3,.3',6; 2,2',3,5,5' | 17 ± 7 | 3 ± 6 |
| 2,2',3,4',6 | 15 ± 11 | 3 ± 6 |
| 2,2',3,4',5; 2,2',4,5,5' | internal std. | internal std. |
| 2,2',4,4',5 | 15 ± 6 | 0 ± 12 |
| 2,2',3',4,5; 2,2',3,5,6,6' | 14 ± 8 | −3 ± 8 |
| 2,2',3,4,5' | 11 ± 9 | 4 ± 7 |
| 2,3,3',4',6; 3,3',4,4' | 12 ± 7 | 4 ± 5 |
| 2,2',3,4',5',6; 2,3,4,4',5 | 18 ± 3 | −1 ± 9 |
| 2,3,3',4,4'; 2,2',3,3',4,6' | 8 ± 3 | 27 ± 35 |

Note: Cometabolism of PCB mixture, 15-hour study. Arthrobacter strain B1B was grown in a fructose-carvone medium and was subsequently used in resting cells suspensions to metabolize Aroclor ® 1242 for fifteen hours. Results were assayed by GC-FID.

The results illustrated in Table 6 show that a variety of PCB compounds could be degraded by Arthrobacter strain B1B that had been induced by l-carvone, a naturally-occurring, non-toxic, environmentally-acceptable PCB analog. The results illustrated in Table 7 also show that a variety of PCB compounds could be degraded by Arthrobacter that had been induced by l-carvone. Hydrolysis of the phenylhexadienoate ring fission product and the phenyl ring show that there is a substantially complete degradation of PCBs without toxic metabolic products. Among the PCBs degraded are the most toxicologically significant PCB congeners, which lead to a range of significant toxicological effects. These results indicate the wide utility obtained from the application of this naturally-occurring, nontoxic, environmentally-acceptable PCB analog to a variety of PCB-contamination problems.

EXAMPLE III

The purpose of this Example is to show that PCB-contaminated environments are bioremediated by the application of a spearmint extract or carvone-containing solution. The spearmint extract or carvone-containing solution effectively induces the bioremediation of PCB-contaminated soil at very low concentrations, less than 50 ppm.

The bioremediation is done in the following manner: Spearmint extract or carvone-containing solution is topically applied to PCB-contaminated soil [at a range of concentrations.] The topical application is done by spraying the ground surface with a solution containing either spearmint extract or carvone-containing solution, or a combination of spearmint extract or carvone-containing solution and Arthrobacter strain B1B at a concentration of $10^8$ cells per gram of contaminated soil. Degradation of a variety of PCBs is measured over time by GC-FID assay.

The above are only examples of the various materials that may remediate PCB-contaminated soil and are in no way intended to limit the scope of the invention. It is intended to include, as part of the concept of this invention, both currently identified microbes and chemicals and those of similar function which become available. Thus, there is herein established the basis for a rapid development of technology for bioremediation of PCBs in contaminated soils, or in biological reactors, which could employ mint extracts or extracts from other plants in combination with known PCB-degraders or by augmentation of the indigenous PCB-degrading microbes in soil.

A wide variety of organic compounds can be utilized as non-toxic analogs of the contaminant which is to be microbiologically degraded. In general, compounds having a structure similar to that of the contaminant and which contain no halogen atoms can be used for this purpose. The identification of the monoterpenoid, l-carvone, as a bioremediation agent has been described above in Example I. l-Carvone was identified using a plant screening assay in combination with a chemical screening assay, both using Arthrobacter strain B1B, a known PCB-degrader. The subsequent addition of mint extract to soil or microbes grown on mint extract is used to bioremediate PCB-contaminated soil. These plant screening, chemical screening and bioremediation methods may be used with other Mentha species to produce components with the ability to induce cometabolism of PCBs. These methods may also be used with other members of the sage family to produce components with the ability to induce cometabolism of PCBs. Indeed, many aromatic plants may contain components with the ability to induce cometabolism of PCBs. l-carvone is found in spearmint and kuroji oils. MERCK INDEX, 10th Edition, #1856, p. 262. d-carvone is found in caraway seed and dill seed oils, and can be isolated from mandarin peel oil. dl-carvone is found in gingergrass oil. Table 3 above provides examples of suitable compounds, some albeit of greater activity than others.

The assays described herein are also amenable to use with other PCB-degrading microbes. Other PCB-degrading microbes are known to be present in the rhizosphere. The rhizosphere microenvironment has been reported to enhance the microbial biodegradation of xenobiotic chemicals. The potential for a rhizosphere effect on PCB biodegradation has not been fully evaluated. Among other microbial members of the rhizosphere that may degrade PCBs are other members of the coryneform group of the Actinomycetaceae (Clavibacter, Arthrobacter, Curtobacterium, and Corynebacterium species). Other microbes that may be used are Acinetobacter sp., Rhodococcus sp., *Pseudomonas putida*, and other Pseudomonas species. Those skilled in the art will be able to determine other microbes appropriate for the screening assays.

The naturally-occurring, non-toxic, environmentally-acceptable PCB analog that induces PCB cometabolism may be contacted with the soil by various means. Generally, the means chosen to contact the analog or the analog plus the added PCB-degrading microbe with the soil will be dependent upon a number of factors including, but not limited to, the degree and duration of contamination of the soil, location and distribution of contamination and the composition and condition of the soil. Where contamination is high but has not been present for an extended period of time, the PCB contaminants will be primarily localized to the top 6" to 10" of the soil. In such a situation, topical application of the analog, for example, by spraying the ground surface with a solution containing the analog or the analog plus the added PCB-degrading microbe, may be used. Various methods may be used for the application of the analog or the analog plus the added PCB-degrading microbe to the soil, such as spraying by hand, by mechanical devices attached to motorized vehicles such as tractors, or by airplane.

Many other environments contaminated with PCBs can be decontaminated by use of the methods described herein. Soils contaminated with PCBs can be rid of the contaminants at a rate which is commercially practical. Aqueous environments can also be suitably treated by the addition of the natural chemicals identified by the methods described herein. Other applications of this process of water or soil treatment are also contemplated, though not specifically identified. PCB-contaminated water may be removed, treated by the disclosed process and the decontaminated product may be delivered directly to the septic tank or some similar treatment may be implemented. It will be recognized that this invention may be used to bioremediate PCB-contaminated soil which is used to graze animals or to enhance residential yards or gardens, as well as commercially used soils.

The amounts of the nonhalogenated compound and the microbes which will be applied to contaminated soil in typical situations will of course be dependent on the type of soil, the depth and concentration of contamination, the weather and climate conditions, the method of application and other external factors of which those skilled in the art will be well aware. Generally, however, it is anticipated that the nonhalogenated compound will be applied in quantities sufficient to induce and maintain the applied microbes. This will generally mean a nonhalogenated compound application in the range of 100–200 mg $kg^{-1}$ soil when incorporated directly into the soil, and 10–100 mg $l^{-1}$ when used to induce microbes grown in a biological reactor prior to application to the contaminated soil. The microbes will be applied in quantities sufficient to provide, broadly, a cell density of at least $10^5$14 $10^6$ cells per gram of soil; more commonly, at least $10^6$–$10^8$ cells per gram of soil, and most preferably, at least $10^8$–$10^9$ cells per gram of soil. Induced cells will be added at a rate which will maintain the soil in an unsaturated condition, and will depend on the soil texture and the rate of moisture evaporation at each unique site. Repetition rates for subsequent applications to the soil will be dependent upon similar considerations as those above, and also upon the type of bacteria used and their survival and reproduction rate under the weather and soil conditions of the field or other area to be treated. Typically we anticipate that repetition of application may be required at intervals of 3–7 days.

The assays and decontamination methods described are amenable to the degradation of a wide variety of PCBs (other than those which have been tested and degraded) including those available under the trade designation Aroclor® 1016, 1231, 1232, 1242, 1248, 1254, and 1260.

The assays and decontamination methods described are also amenable to the degradation of other halogenated contaminants besides PCBs. Many other toxic halogen-containing contaminants find their way into natural environments such as soil and water. Agricultural contaminants that can be degraded as in the methods described herein include, for example, heptachlor, aldrin, dieldrin, 4,4'-DDE, 4,4'-DDT, endrin, 4,4'-DDD, heptachlor epoxide, chlordane, endrin aldehyde, and hexachlorobenzene. Other chemical contaminants include bis(2-chloroethyl)ether, 1,3-dichlorobenzene, 1,4-dichloro-benzene, 1,2-dichlorobenzene, bis(2-chloroisopropyl) ether, hexachloroethane, bis(2-chloroethoxy)methane, 1,2,4-trichloro-benzene, hexachlorobutadiene, hexachlorocyclopentadiene, 2-chloronaphthalene, 4-chlorophenyl phenyl ether, 4-bromophenyl phenyl ether, 2-chlorophenol, 2,4-dichlorophenyl, 4-chloro-3-methylphenol, 2,4,6-trichlorophenol, pentachlorophenol, methylene chloride, trichlorofluoro-methane, 1,1-dichloroethylene, 1,1-dichloroethane, 1,2-dichloroethylene, chloroform, 1,2-dichloroethane, 1,1,2-trichloroethane, 1,1,1-trichloroethane, bromo-dichloromethane, 1,2-dichloropropane, trichloroethylene, 1,3-dichloro-propane, bromoform, 1,1,2,2-tetrachloroethane, 1,1,2,2-tetrachloroethylene, chlorobenzene, methyl bromide, carbon tetrachloride, 2-chloroethyl vinyl ether, bis(chloroethyl) ether and dichlorodifluoromethane. Other agricultural contaminants including various other pesticides and herbicides and other halogen-containing organics from various sources including industrial wastes can also be similarly treated.

It will be evident that there are numerous embodiments of this invention which, while not expressly set forth above, are clearly within the scope and spirit of the invention. The above description, therefore intends to be exemplary only, and the scope of the invention is to be determined solely by the appended claims. While certain specific embodiments of the invention have been disclosed as typical, the invention is, of course, not limited to these particular forms, but rather is applicable to all such variations as fall within the scope of the claims. In addition, the concentrations applied to natural environments may vary widely within the scope of the present invention.

We claim:

1. A method for degrading polychlorinated biphenyl compounds comprising placing a nonhalogenated terpenoid compound that induces the microbial cometabolism of said polychlorinated biphenyl compounds in contact with an environment contaminated with said polychlorinated biphenyl compounds and containing indigenous microbes capable of degrading said polychlorinated biphenyl compounds in the presence of said nonhalogenated terpenoid compound, and maintaining said contact for a time sufficient to enable said microbes to degrade at least a significant portion of said polychlorinated biphenyl compounds in said environment.

2. A method for degrading polychlorinated biphenyl compounds as in claim 1, wherein said nonhalogenated terpenoid compound has been identified by a plant screening method for assaying vegetable matter for contained compounds, said contained compounds being potentially capable of inducing microbial degradation of polychlorinated biphenyl compounds.

3. A method for degrading polychlorinated biphenyl compounds as in claim 1, wherein said nonhalogenated terpenoid compound has been identified by a chemical screening method for assaying compounds, compounds so assayed being potentially capable of inducing microbial degradation of polychlorinated biphenyl compounds.

4. A method for degrading polychlorinated biphenyl compounds as in claim 1, wherein said nonhalogenated terpenoid compound is a terpene.

5. A method for degrading polychlorinated biphenyl compounds as in claim 4 wherein said terpene is a monoterpene, sesquiterpene or diterpene.

6. A method for degrading polychlorinated biphenyl compounds as in claim 4 wherein said terpene contains as unsaturated para-menthane moiety.

7. A method for degrading polychlorinated biphenyl compounds as in claim 1, wherein said nonhalogenated terpenoid compound is a carvone, limonene, cymene, pinene or abietic acid.

8. A method for degrading polychlorinated biphenyl compounds as in claim 1, wherein said nonhalogenated terpenoid compound is a component of spearmint, pine, orange, eucalyptus or ivy.

9. A method for degrading polychlorinated biphenyl compounds as in claim 1 comprising:

a. placing a nonhalogenated terpenoid compound that induces the microbial cometabolism of said polychlorinated biphenyl compounds in contact with an environment contaminated with said polychlorinated biphenyl compounds and containing indigenous microbes capable of slowly degrading said polychlorinated biphenyl compounds in the presence of said nonhalogenated terpenoid compound;

b. also placing in contact with said environment non-indigenous microbes capable of degrading said polychlorinated biphenyl compounds in the presence of said nonhalogenated terpenoid compound at a more rapid rate than that of said indigenous microbes; and c. maintaining said contact of said nonhalogenated terpenoid compound and said non-indigenous microbes with said environment for a time sufficient to enable said indigenous and non-indigenous microbes to degrade at least a significant portion of said polychlorinated biphenyl compounds in said environment.

10. A method as in claim 9 wherein at least a portion of said non-indigenous microbes are placed in contact with said environment following placing of said nonhalogenated terpenoid compound in contact with said environment.

11. A method as in claim 9 wherein at least a portion of said non-indigenous microbes are placed in contact with said environment simultaneously with placing of said nonhalogenated terpenoid compound in contact with said environment.

12. A method for degrading polychlorinated biphenyl compounds as in claim 11 wherein said contaminated environment comprises soil and nonhalogenated terpenoid compound is contacted with said indigenous microbes at a concentration in the range of 10–100 mg $l^{-1}$ soil ex situ prior to application of non-indigenous microbes to said contaminated soil.

13. A method for degrading polychlorinated biphenyl compounds as in claim 9, wherein said nonhalogenated terpenoid compound has been identified by a plant screening method for assaying vegetable matter for contained compounds, said contained compounds being potentially capable of inducing microbial degradation of polychlorinated biphenyl compounds.

14. A method for degrading polychlorinated biphenyl compounds as in claim 9, wherein said nonhalogenated terpenoid compound has been identified by a chemical screening method for assaying compounds, compounds so assayed being potentially capable of inducing microbial degradation of polychlorinated biphenyl compounds.

15. A method for degrading polychlorinated biphenyl compounds as in claim 9, wherein said non-indigenous microbes are Arthrobacter sp.

16. A method for degrading polychlorinated biphenyl compounds as in claim 15, wherein said non-indigenous microbes are Arthrobacter strain B1B.

17. A method for degrading polychlorinated biphenyl compounds as in claim 9, wherein said nonhalogenated terpenoid compound is a terpene.

18. A method for degrading polychlorinated biphenyl compounds as in claim 17 wherein said terpene is a monoterpene, sesquiterpene or diterpene.

19. A method for degrading polychlorinated biphenyl compounds as in claim 18 wherein said terpene contains an unsaturated para-menthane moiety.

20. A method for degrading polychlorinated biphenyl compounds as in claim 18, wherein said nonhalogenated terpenoid compound is a carvone, limonene, cymene, pinene or abietic acid.

21. A method for degrading polychlorinated biphenyl compounds as in claim 9, wherein said nonhalogenated terpenoid compound is a component of spearmint, pine, orange, eucalyptus or ivy.

* * * * *